(No Model.)
C. A. HODGE.
WHEEL.
No. 567,981. Patented Sept. 22, 1896.
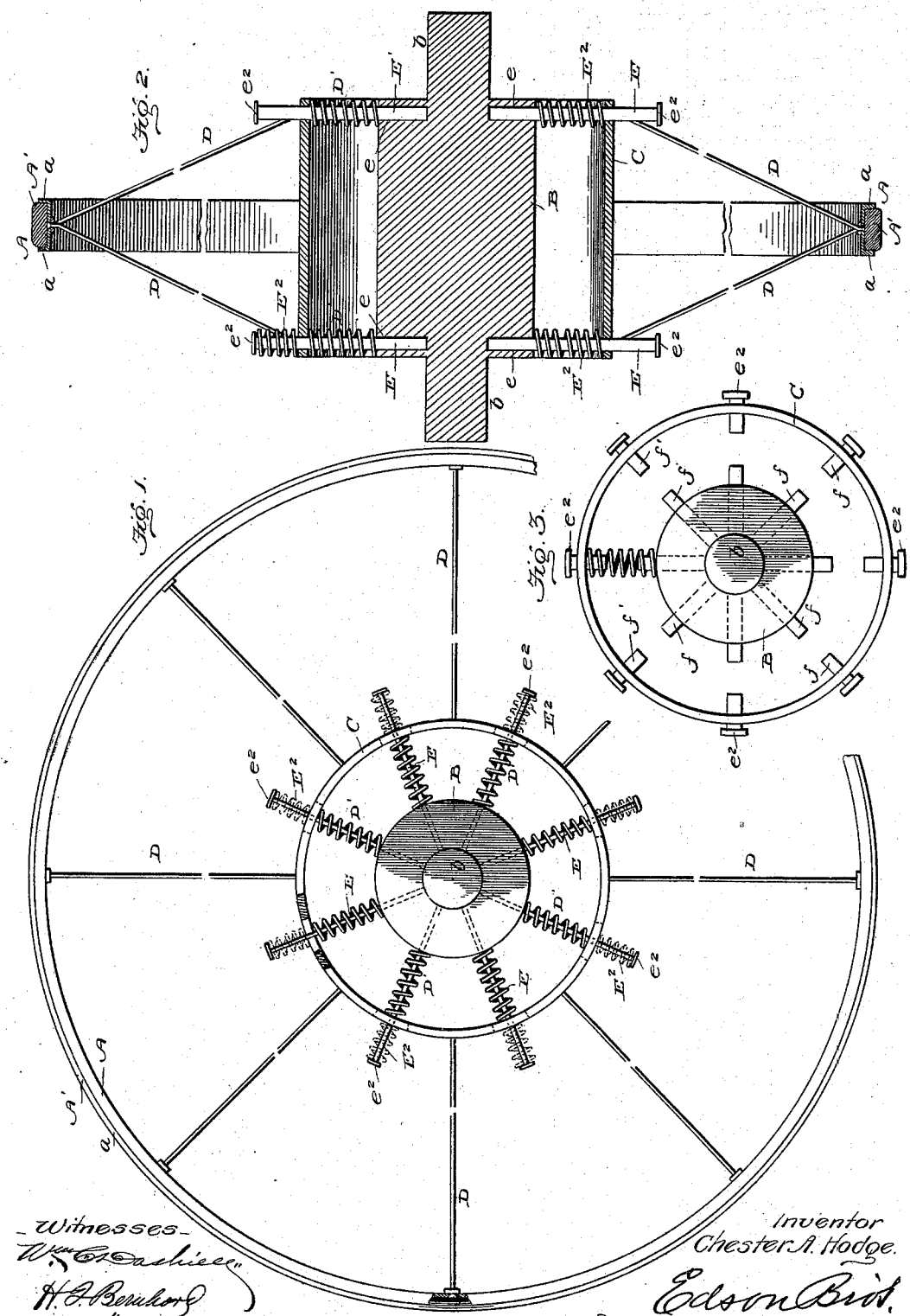
Witnesses
Inventor
Chester A. Hodge.
By
Edson Bro.
Attys

UNITED STATES PATENT OFFICE.

CHESTER A. HODGE, OF TURNER, ILLINOIS.

WHEEL.

SPECIFICATION forming part of Letters Patent No. 567,981, dated September 22, 1896.

Application filed October 7, 1895. Serial No. 564,908. (No model.)

*To all whom it may concern:*

Be it known that I, CHESTER A. HODGE, a citizen of the United States, residing at Turner, in the county of Du Page and State of Illinois, have invented certain new and useful Improvements in Wheels; and I do hereby declare the following to be a full, clear, and exact description of the invention, such as will enable others skilled in the art to which it appertains to make and use the same.

My invention relates to improvements in wheels especially designed and constructed for use on bicycles and other fast-speed machines or vehicles; and the object that I have in view is to provide a simple construction which will reduce to a minimum the shock and jar on the machine-frame and the occupant thereof due to the wheel striking or riding over a stone, rut, or other obstruction in its path. In a wheel of this character the parts must be compactly arranged and substantially constructed to enable the central hub to oscillate or play in all directions against the action of the devices (sustaining-springs) which maintain said central hub in concentric relation to the wheel-felly when in normal position in a state of rest, so that no matter what relation the spokes assume with relation to the hub and no matter in what direction the stress is exerted by the obstruction in the path of the wheel the hub will be free to play or move against the tension-springs and reduce to a minimum the shock and jar transmitted to the machine-frame.

To the accomplishment of these ends the invention consists in the combination, with a wheel-felly, a rim or sleeve concentric at all times with relation to the felly, and spokes which couple the inner rim or sleeve and said felly together, of a movable hub or bearing fitted within the sleeve or rim and arranged to be free from contact therewith, coiled springs arranged between the central movable hub or bearing and the fixed sleeve or rim, and pins which serve to hold or confine the coiled springs in place, but which permit the hub or bearing to have the necessary freedom of movement in any direction within the sleeve or ring.

In one embodiment of my invention I prefer to employ long guide-pins, which are fastened in the movable central hub and which pass freely through elongated openings in the fixed sleeve or rim, and on each pin are placed two springs, one of which bears against the inside of the fixed sleeve or ring and the movable hub, while the other spring is disposed externally to the fixed sleeve or hub, so as to bear thereon and against a head or nut on the end of the pin.

Another embodiment of the invention consists in providing short studs on the inner face of the movable hub, arranging the hub within the sleeve or ring so that it can oscillate therein without the pins striking, and placing coiled springs around the pins on the opposing faces of the hub and sleeve, so that the pins serve to hold the springs in position and the springs sustain the hub within the sleeve or ring, while permitting said hub to have the necessary freedom of movement; and the invention further consists in the novel construction and arrangement of parts which will be hereinafter fully described and claimed.

To enable others to more readily understand my invention, I have illustrated the same in the accompanying drawings, forming a part of this specification, and in which—

Figure 1 is an elevation of a wheel constructed in accordance with my invention. Fig. 2 is a vertical transverse sectional view through the wheel on the plane indicated by the dotted line $x\,x$ of Fig. 1. Fig. 3 is a side elevation of a part of a wheel, showing a modified construction.

Like letters of reference denote corresponding parts in all the figures of the drawings.

My improved spring-wheel is made of metal in a light but strong substantial manner, and it consists of a bent metallic felly A, a movable hub B, a concentric inner rim or sleeve C, springs D, which unite the felly A and the inner rim or sleeve C rigidly together and which maintain the rim or sleeve C in a fixed concentric position relatively to the felly A, and springs D to sustain the hub B in movable relation to the fixed rim or sleeve C.

The fixed rim or sleeve C may be in the form of a continuous sleeve which extends transversely across the wheel, or it may be in the form of a divided ring, one part of which is near one end of the hub and the other part near the other end of the hub. The inner ends of the two series of spokes are secured in the sleeve or divided rim in any suitable rigid manner, while the outer ends of the spokes are fastened in the felly A in the usual way.

The felly A is bent outward at its side edges to form the annular parallel flanges $a$, and between said flanges $a$ is secured a noise-deadening tire A', of rubber or other appropriate material.

The hub or bearing B is preferably cast or otherwise wrought in a single piece, and at its ends this hub has the prolonged trunnions $b$, by which it is adapted to receive the bicycle-frame or to be journaled in bearings in said frame.

There are two series of springs D used, one series being provided near one end of the sleeve or one rim C and hub B and the other series of springs being between the other end of the hub B and sleeve or rim C. These springs are coiled out of strong steel wire, and they are arranged in radial positions relatively to the hub and sleeve or rim C. To hold the springs in place, I provide the two series of radial guide-pins E E', one pin being devoted to each spring.

In Figs. 1 and 2 I employ long guide-pins E E', which pass loosely through elongated narrow openings (indicated by dotted lines in Fig. 1) in the sleeve or rim C, and have threaded inner ends, which are screwed adjustably in threaded sockets $e$, provided in the hub B, and on said pins are fitted the radial springs E E', the inner ends of which bear upon the hub B all around its circumference, near both ends thereof, while the outer ends of the two series of springs bear against the inner circumference of the sleeve or rim C near its ends. The elongated openings provided in the rim or sleeve C are only wide enough for the pins to play in said openings, and the width of said openings is less than the diameter of the springs, so that the springs have proper bearing or support on the rim or sleeve. In some instances the pins are prolonged or extended suitable distances beyond the outer circumference of the sleeve or rim C, and on these prolonged ends are fitted supplementary coiled spring $E^2$, which rest at their inner ends upon the external surface of the rim or sleeve C, and which springs have their outer ends bearing against heads or nuts $e^2$ on the outer extremities of the radial fixed guide-pins.

In Fig. 3 of the drawings I have illustrated another embodiment of my invention, in which short guide-pins $f\ f'$ are provided on the opposing surfaces of the hub B and the sleeve or rim C. These pins are quite short, so that the hub B can have the desired oscillating movement within the sleeve C without liability of the pins striking against one another and thereby causing breakage or damage to the parts. In this embodiment of the invention two pins are necessary to properly retain the ends of each spring in position to bear against the opposing faces of the sleeve and hub. If it is desired in the embodiment of the invention shown by Fig. 3 to employ external springs to bear upon the outside circumference of the rim or sleeve C, the studs or pins $f$ attached to the rim or sleeve may be prolonged or extended through the rim or sleeve and provided with heads. On these extended ends of the pins or studs are fitted the supplementary springs, which are arranged to have their ends bear against the heads and the sleeve respectively.

A wheel constructed in accordance with my invention has all its parts exposed to view and arranged so as to be readily accessible at all times without taking the wheel apart for the purposes of inspection and repair. The rider or occupant of the vehicle can ascertain by a glance at the wheel whether any of the parts have become broken or deranged or whether any of the springs have become compressed and caught so as to be inoperative. In this event the broken part or defective spring can be easily taken out, replaced, or readjusted without affecting any of the other parts.

The hub B is sustained by the springs and guide-pins within the sleeve or rim C in a manner to move or oscillate freely therein in any direction, no matter from what direction the stress and strain may come, when the wheel meets with an obstruction, and by sustaining the hub yieldingly within the fixed rim or sleeve the springs are caused to take up the shock and jar when the wheel meets an obstruction, and the shock on the frame is reduced to a minimum.

My improved wheel is light, strong, and durable in construction, and it can be manufactured at a low cost.

Having thus fully described my invention, what I claim as new, and desire to secure by Letters Patent, is—

1. In a wheel, the combination with a felly, a fixed sleeve or rim, and spokes which sustain the sleeve or rim in a fixed position concentric with the felly, of a movable hub arranged within the fixed sleeve or rim, radial guide-pins engaging with the rim or sleeve and with the movable hub, and radial coiled springs fitted loosely on the guide-pins to bear against the sleeve or rim and the movable hub and held by said pins in radial positions to the hub, substantially as described.

2. The combination with a felly, a fixed sleeve or rim, and the spokes, of the movable hub within the sleeve or rim, the short pins or studs on the sleeve or rim and the hub, and the radial springs between the hub and sleeve, each spring having the ends thereof loosely confined in place against the hub and sleeve by a pair of pins which are fastened respectively to the hub and the sleeve, substantially as described.

3. The combination with a felly, of an openended sleeve or ring, the spokes, the movable hub arranged within and exposed through the ends of the sleeve or ring, the two sets of exposed guide-pins arranged near the ends of the hub, and the two sets of exposed radial springs fitted on said guide-pins to play freely thereon and having their ends seated against the hub and against the sleeve or ring, substantially as and for the purposes described.

In testimony whereof I affix my signature in presence of two witnesses.

CHESTER A. HODGE.

Witnesses:
W. CULLEN B. JAYNES,
A. J. HODGE.